(12) United States Patent
Bouchet

(10) Patent No.: US 11,794,509 B2
(45) Date of Patent: Oct. 24, 2023

(54) TEXTURED BALL SEAT

(71) Applicant: Société BIC, Clichy (FR)

(72) Inventor: Julien Bouchet, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 322 days.

(21) Appl. No.: 16/973,984

(22) PCT Filed: Jun. 25, 2019

(86) PCT No.: PCT/EP2019/066837
§ 371 (c)(1),
(2) Date: Dec. 10, 2020

(87) PCT Pub. No.: WO2020/007653
PCT Pub. Date: Jan. 9, 2020

(65) Prior Publication Data
US 2021/0245543 A1 Aug. 12, 2021

(30) Foreign Application Priority Data
Jul. 3, 2018 (EP) ..................................... 18181509

(51) Int. Cl.
*B43K 1/08* (2006.01)
*B23K 26/00* (2014.01)
*B23K 26/386* (2014.01)

(52) U.S. Cl.
CPC .......... *B43K 1/084* (2013.01); *B23K 26/0006* (2013.01); *B23K 26/386* (2013.01)

(58) Field of Classification Search
CPC ............. B43K 1/084; B43K 1/08; B43K 7/10
See application file for complete search history.

(56) References Cited

U.S. PATENT DOCUMENTS

| | | | |
|---|---|---|---|
| 3,145,286 A | 8/1964 | Hans et al. | |
| 3,166,618 A * | 1/1965 | Fehling | B29C 45/00 |
| | | | 264/296 |

(Continued)

FOREIGN PATENT DOCUMENTS

| | | |
|---|---|---|
| DE | 1511360 A1 | 7/1969 |
| FR | 1158510 A | 6/1958 |

OTHER PUBLICATIONS

International Search Report and Written Opinion in corresponding Application No. PCT/EP2019/066837, dated Aug. 27, 2019, (12 pages).

*Primary Examiner* — J C Jacyna
(74) *Attorney, Agent, or Firm* — Bookoff McAndrews, PLLC

(57) ABSTRACT

A metallic ball pen tip for a writing instrument comprising a feeding passage extending in an axial direction, the feeding passage reaching in a recess configured to receive a ball, the recess being defined by a cylindrical wall and a ball seat, wherein the ball seat comprises a plurality of feeding grooves and wherein the ball seat is textured, the texture comprising a plurality of blind holes having a depth equal to or smaller than 50 μm, preferably equal to or smaller than 10 μm, more preferably equal to or smaller than 5 μm, more preferably equal to or smaller than 1 μm, the blind holes having a total surface equal to or greater than 20% of the ball seat, preferably 60% and equal to or smaller than 90% of the ball seat, preferably 85%. A method of manufacturing a metallic ball pen tip.

16 Claims, 4 Drawing Sheets

(56) References Cited

U.S. PATENT DOCUMENTS

| | | | | |
|---|---|---|---|---|
| 3,261,326 A * | 7/1966 | Ryan | ............... | B43K 1/08 |
| | | | | 401/216 |
| 3,678,565 A * | 7/1972 | Linz | ............... | B43K 1/084 |
| | | | | 29/441.2 |
| 3,781,123 A * | 12/1973 | Linz | ............... | B43K 1/084 |
| | | | | 106/31.6 |
| 8,430,591 B1 * | 4/2013 | Okamoto | ............... | B43K 1/084 |
| | | | | 401/215 |
| 2012/0328356 A1 * | 12/2012 | Ishii | ............... | B43K 15/00 |
| | | | | 401/216 |

* cited by examiner

TEXTURED BALL SEAT

CROSS REFERENCE TO RELATED APPLICATION(S)

This application is a National Stage Application of International Application No. PCT/EP2019/066837, filed on Jun. 25, 2019, now published as WO2020007653 and which claims priority to EP Application No. 18181509.3, filed on Jul. 3, 2018.

TECHNICAL FIELD

The present disclosure is related to writing instrument, and more particularly to manual writing instrument having a ball tip.

PRIOR ART

Metallic ball pen tip are known and comprise a ball received in a recess, the ink being delivered on the writing support, such as a sheet of paper, by a ball received in a recess of the ball pen tip, the ball moving relative to a ball seat of the ball pen tip.

SUMMARY

Currently, it remains desirable to improve the smoothness of writing and to reduce tip wear.

Therefore, according to embodiments of the present disclosure, a metallic ball pen tip for a writing instrument is provided. The metallic ball pen tip for a writing instrument includes a feeding passage extending in an axial direction, the feeding passage reaching in a recess configured to receive a ball, the recess being defined by a cylindrical wall and a ball seat, wherein the ball seat comprises a plurality of feeding grooves and wherein the ball seat is textured, the texture comprising a plurality of blind holes having a depth equal to or smaller than 50 µm, preferably equal to or smaller than 10 µm, more preferably equal to or smaller than 5 µm, more preferably equal to or smaller than 1 µm, the blind holes having a total surface equal to or greater than 20% of the ball seat, preferably 60% and equal to or smaller than 90% of the ball seat, preferably 85%.

By providing such a configuration, it is possible to improve the smoothness of writing and to reduce tip wear. Thanks to the depth and the total surface of the blind hole, it is possible to ensure the presence of a continuous layer of ink between the ball and the ball seat, the continuous layer of ink allowing for smoothness in writing.

In some embodiments, the blind holes have a closed contour section.

In some embodiments, the blind holes have a circular section having a diameter equal to or greater than 10 µm and equal to or smaller than 150 µm.

In some embodiments, the blind holes have an elongated section having a width equal to or greater than 10 µm and equal to or smaller than 150 µm and a length equal to or greater than 70 µm, preferably equal to or greater than 135 µm and equal to or smaller than 350 µm, preferably equal to or smaller than 320 µm.

In some embodiments, the blind holes are interconnected.

In some embodiments, the blind holes open into the feeding grooves.

In some embodiments, the blind holes open into the feeding passage.

In some embodiments, the blind holes are spaced apart from one another from a distance equal to or greater than half the diameter or half the width of the blind hole and equal to or smaller than the diameter or the width of the blind hole.

According to embodiments of the present disclosure, a writing instrument is provided. The writing instrument includes a metallic ball pen tip as defined.

In some embodiments, the writing instrument includes a ball received in the recess.

In some embodiments, the ball seat is made of metallic alloy.

Examples of metallic alloy include brass or nickel or silver or stainless steel. Preferably, the metallic alloy includes brass.

In some embodiments, the ball is made of tungsten carbide alloy.

According to embodiments of the present disclosure, a method of manufacturing a metallic ball pen tip is provided. The metallic ball pen tip includes a feeding passage extending in an axial direction, the feeding passage reaching in a recess configured to receive a ball, the recess being defined by a cylindrical wall and a ball seat, wherein the ball seat comprises a plurality of feeding grooves and wherein the ball seat is textured, the texture comprising a plurality of blind holes having a depth equal to or smaller than 50 µm, preferably equal to or smaller than 10 µm, more preferably equal to or smaller than 5 µm, more preferably equal to or smaller than 1 µm, the blind holes having a total surface equal to or greater than 20% of the ball seat, preferably 60% and equal to or smaller than 90% of the ball seat, preferably 85%. The method includes a step of making the blind holes using a laser technology, preferably a femtosecond laser.

A picosecond laser may also be used. Thanks to the very short time of the laser impulse used to make the blind hole, the mechanical properties of the ball seat are not modified. Moreover, there are no burr made that could detach from the blind holes during use of the writing instrument and that could damage both the ball seat and/or the ball and thus make the writing less smooth.

Furthermore, using laser technology allows avoiding the use of chemical reagent, which can be environmentally hazardous, and/or the use of degreasing agent for cleaning the metallic ball pen tip before making the blind holes.

Production line is also less complex has the laser technology may be integrated in the existing production chain with few modifications, the laser head being for example away from the laser source.

The laser source may also be adapted to different materials, whereas chemical reagents are each dedicated to a specific material.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
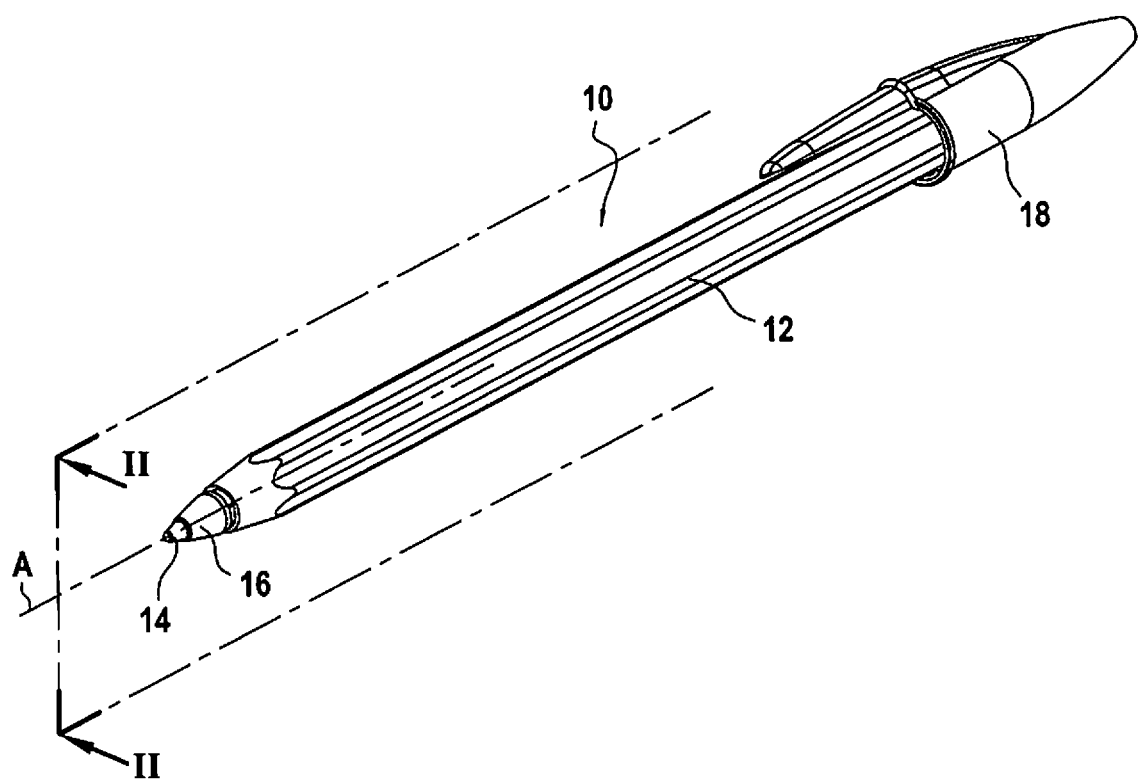
FIG. 1 shows a representation of an exemplary writing instrument according to embodiments of the present disclosure.
Figure 2:
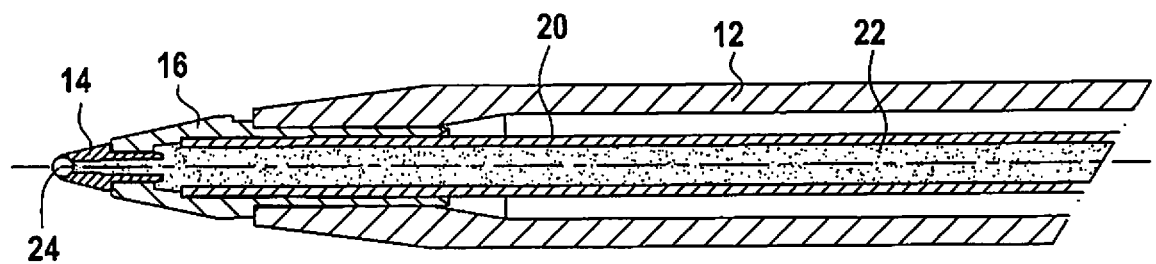
FIG. 2 shows a cross-section along II-II of the exemplary writing instrument of FIG. 1.

FIG. 1 shows a representation of an exemplary writing instrument 10 according to embodiments of the present disclosure. The writing instrument 10 may include a body 12 extending along an axial direction A. The writing instrument may comprise a metallic ball pen tip 14, which is mounted on the body 12 of the writing instrument 10 through a mounting sleeve 16. The writing instrument 10 may also comprise a cap 18 for protecting the metallic ball pen tip 14. As can be seen on FIG. 2, the mounting sleeve 16 may also connect the metallic ball pen tip 14 to an ink reservoir 20. The ink reservoir 20 stores ink 22 which is to be delivered by a ball 24 received in the metallic ball pen tip 14. The ink reservoir is in fluidic connection with the ball 24 through the mounting sleeve 16 and the metallic ball pen tip 14.

The metallic ball pen tip 14 may be made of brass for example.

Figure 3:
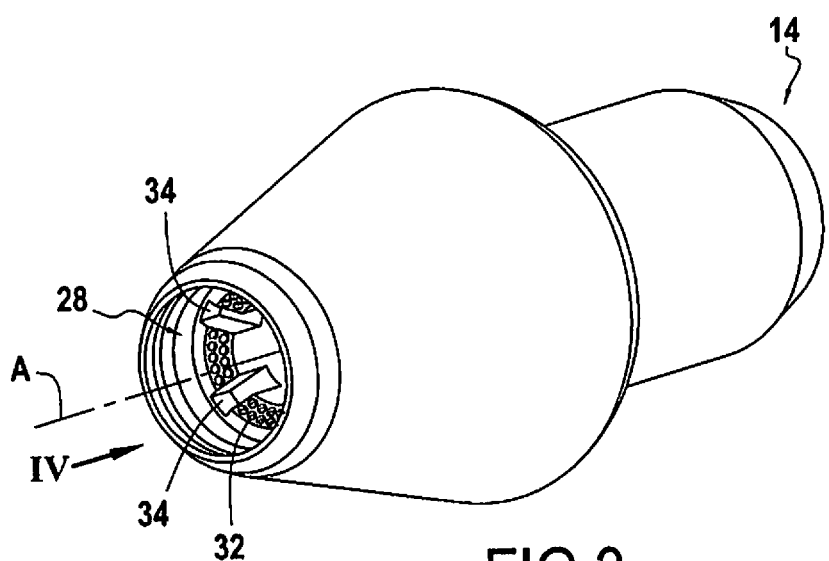
FIGS. 3 and 4 show an exemplary metallic ball pen tip according to embodiments of the present disclosure.
Figure 4:
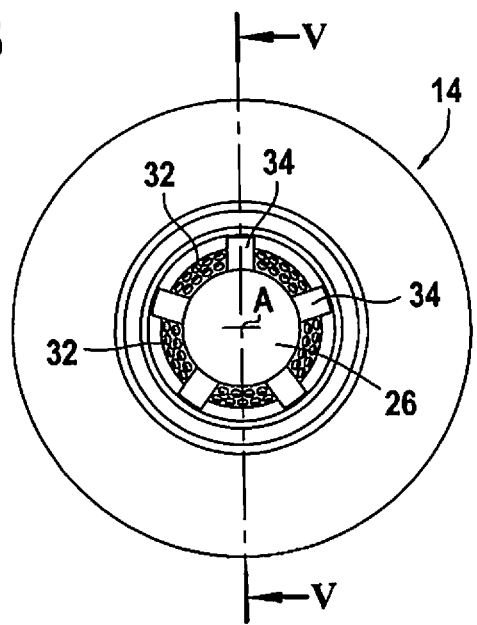
Figure 5:
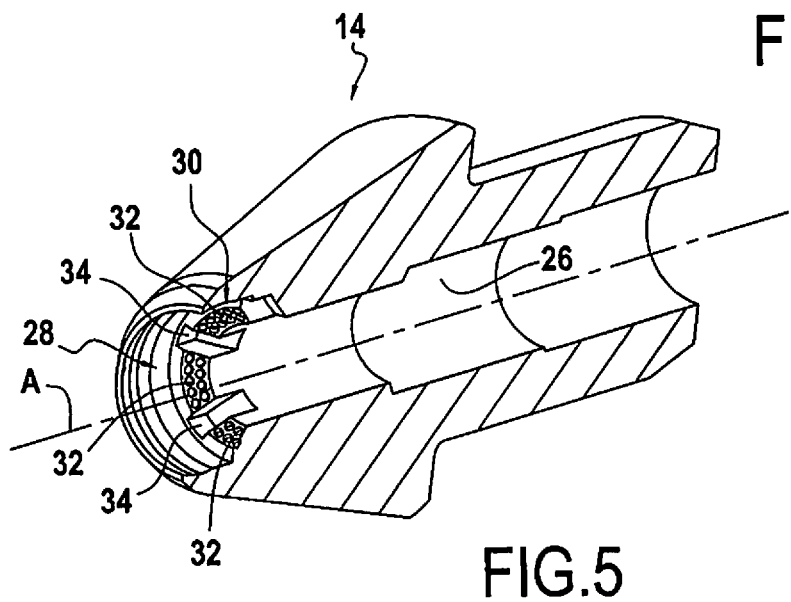
FIG. 5 shows a cross-section along V-V of the exemplary metallic ball pen tip of FIG. 4.

As shown at FIGS. 3-5, the metallic ball pen tip 14 may comprise a feeding passage 26 extending in the axial direction A. The feeding passage 26 extends from one axial end of the metallic ball pen tip 14 to a recess 28. The recess may be defined by a cylindrical wall 30 and a ball seat 32. The ball seat 32 may comprise a plurality of feeding grooves 34. The feeding grooves 34 allows the ink 22 to flow from the ink reservoir 20 into the recess 28, especially when the ball 24 is received in the recess 28.

As shown at FIGS. 3-5, the ball seat 32 is textured. FIGS. 6-15 show exemplary textured ball seats 32.

The ball seat 32 is textured and the texture comprises a plurality of blind holes 36 that can be better seen at FIGS. 6-15. As can be seen on FIGS. 6-15, the blind holes 36 may have various shapes. The expression blind hole is used as the holes 36 have a bottom surface, i.e. the blind holes 36 are not through bores in the axial direction A.

According to some embodiments, the blind holes 36 have a closed contour section 36A.

Figure 6:
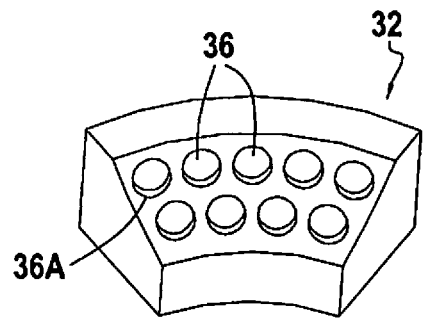
FIGS. 6-15 show exemplary textured ball seats according to embodiments of the present disclosure.
Figure 7:
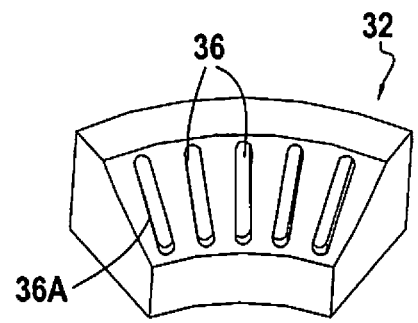
Figure 8:
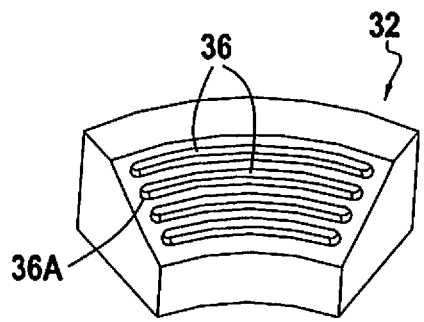
Figure 9:
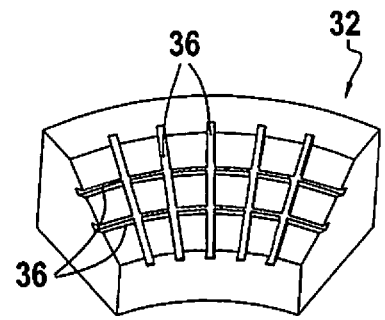
Figure 10:
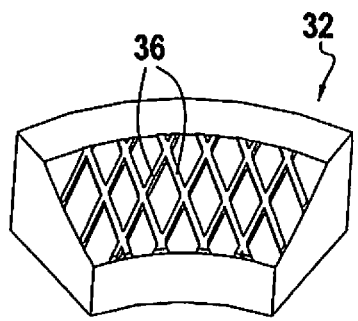
Figure 11:
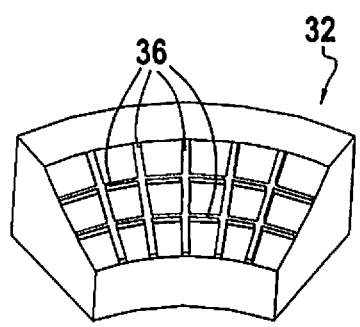
Figure 12:
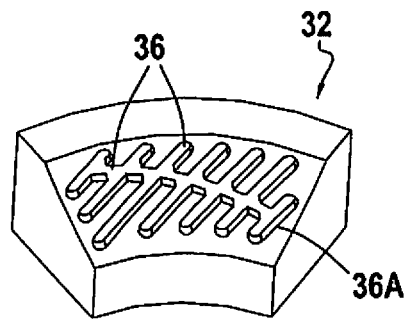
Figure 13:
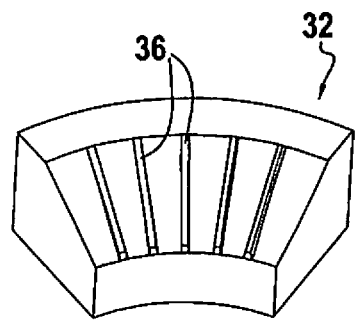
Figure 14:
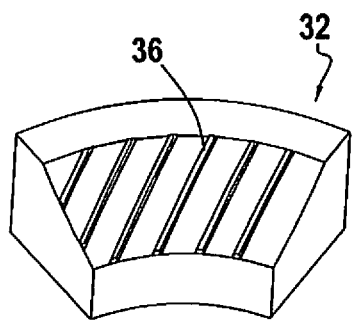
Figure 15:
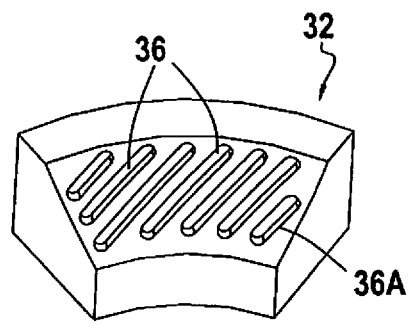

According to some embodiments, the blind holes 36 may have a circular section, see FIG. 6.

According to some embodiments, the blind holes 36 may have an elongated section, see FIGS. 7-15.

According to some embodiments, the blind holes 36 may be interconnected with one another, see FIGS. 9-12.

According to some embodiments, the blind holes 36 may open into the feeding passage, see FIGS. 9-11, 13 and 14.

According to some embodiments, the blind holes 36 may open into the feeding grooves, see FIGS. 9-11 and 14.

Comparative tests have been carried out on two metallic ball pen tips made of brass having the same geometry, except that one of the metallic ball pen tip had textured ball seat.

For example, the blind holes 36 may be of circular section having a diameter of 60 μm and a depth of 0.5 μm, the blind holes 36 being aligned on an imaginary grid, the blind holes 36 being disposed at the crossing of the imaginary grid and the blind holes being spaced apart from a distance equal to 60 μm, i.e., the crossing of the imaginary grid being spaced apart from a distance equal to 120 μm.

The blind holes 36 may be obtained using a laser technology, for example a femtosecond laser or a picosecond laser, for example with impulse around 350 fs (femtosecond).

The tests were carried out with a ball 24 being made of tungsten carbide and having a diameter of 1 mm (millimetre) received in the recess of the metallic ball pen tip 14 with an ink 22 having a viscosity comprised between 12 to 16 Pa·s$^{-1}$ (Pascal per second) in the ink reservoir 22. The ball 24 was rotated at a speed of 1432 t/min (tour per minute) on the surface of the ball seat 32, i.e. the speed correspond to the speed of the ball 24 relative to a sheet of paper for example. It has been measured that the average friction coefficient is reduced by at least 25% when the ball seat 32 is textured compared to the friction coefficient measured with a non-textured ball seat 32.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A metallic ball pen tip for a writing instrument, the metallic ball pen tip comprising a feeding passage extending in an axial direction, the feeding passage reaching in a recess configured to receive a ball, the recess being defined by a cylindrical wall and a ball seat, wherein the ball seat comprises a plurality of feeding grooves and wherein the ball seat is textured, the texture comprising a plurality of blind holes having a depth equal to or smaller than 50 μm, the blind holes having a total surface equal to or greater than 20% of the ball seat, and equal to or smaller than 90% of the ball seat;

wherein the blind holes have an elongated section having a width equal to or greater than 10 μm and equal to or smaller than 150 μm and a length equal to or greater than 70 μm.

2. The metallic ball pen tip according to claim 1, wherein the blind holes have a closed contour section.

3. The metallic ball pen tip according to claim 1, wherein the blind holes open into the feeding passage.

4. The metallic ball pen tip according to claim 1, wherein the blind holes are spaced apart from one another from a distance equal to or greater than half the diameter or half the width of the blind hole and equal to or smaller than the diameter or the width of the blind hole.

5. A writing instrument, comprising a metallic ball pen tip according to claim 1.

6. A writing instrument according to claim 5, comprising a ball received in the recess.

7. A writing instrument according to claim 5, wherein the ball seat is made of metallic alloy and the ball is made of tungsten carbide alloy.

8. A method of manufacturing a metallic ball pen tip for a writing instrument, the metallic ball pen tip comprising a feeding passage extending in an axial direction, the feeding passage reaching in a recess configured to receive a ball, the recess being defined by a cylindrical wall and a ball seat, wherein the ball seat comprises a plurality of feeding grooves and wherein the ball seat is textured, the texture comprising a plurality of blind holes having a depth equal to or smaller than 50 µm, the blind holes having a total surface equal to or greater than 20% of the ball seat and equal to or smaller than 90% of the ball seat, the method comprising a step of making the blind holes using a laser technology;

wherein the blind holes have an elongated section having a width equal to or greater than 10 µm and equal to or smaller than 150 µm and a length equal to or greater than 70 µm.

9. A writing instrument according to claim 7, wherein the ball seat is made of brass.

10. The metallic ball pen tip according to claim 1, comprising a plurality of blind holes having a depth equal to or smaller than 10 µm.

11. The metallic ball pen tip according to claim 1, comprising a plurality of blind holes having a depth equal to or smaller than 5 µm.

12. The metallic ball pen tip according to claim 1, comprising a plurality of blind holes having a depth equal to or smaller than 1 µm.

13. The metallic ball pen tip according to claim 1, comprising blind holes having a total surface equal to or greater than 60% of the ball seat.

14. The metallic ball pen tip according to claim 1, wherein the blind holes have a length between 135 µm and 350 µm.

15. The metallic ball pen tip according to claim 1, wherein the blind holes have a length between 135 µm and 320 µm.

16. A method of manufacturing a metallic ball pen tip according to claim 15, wherein a femtosecond laser is used to make the blind holes.

* * * * *